United States Patent [19]

Hollett

[11] Patent Number: 4,891,770
[45] Date of Patent: Jan. 2, 1990

[54] APPARATUS AND PROCESS FOR CREATING VARIABLY SIZED BLOCK DIAGRAMS TO ACCOMMODATE VARIABLE TEXT CONTENTS WHILE YET RETAINING OVERALL BLOCK SHAPE

[75] Inventor: Raymond M. Hollett, Woodbridge, England

[73] Assignee: British Telecommunications public limited company, London, England

[21] Appl. No.: 77,918

[22] Filed: Jul. 27, 1987

[30] Foreign Application Priority Data

Jul. 31, 1986 [GB] United Kingdom ............... 8618664

[51] Int. Cl.$^4$ ............................................. G06F 3/153
[52] U.S. Cl. ................................... 364/521; 364/518; 340/731
[58] Field of Search ............... 364/518, 521, 488–491, 364/512; 340/731

[56] References Cited

U.S. PATENT DOCUMENTS 4,710,885 12/1987 Litteken ........................... 364/518
4,755,955 7/1988 Kimura et al. ................. 364/521 X

OTHER PUBLICATIONS

Patents Abstracts of Japan, vol. 10, No. 26 (P-425) [2083], 31st Jan. 1986; & JP-A-60 176 178, (Fujitsu).
Proceedings of the IEEE International Conference on Circuits and Computers, ICCC80, 1st–3rd Oct. 1980, vol. 1, pp. 107–110, IEEE, N.Y., U.S.; Rubin: "A Logic Design Data Entry System"-p. 107, col. 1, lines 46-50; p. 108, col. 1, lines 1-9; p. 109, col. 2, lines 30-39, 55-62.

Primary Examiner—Gary V. Harkcom
Assistant Examiner—Mark K. Zimmerman
Attorney, Agent, or Firm—Nixon & Vanderhye

[57] ABSTRACT

A computer aided design system processes input instructions to produce block diagrams. Each block has sub-blocks and text may be placed into each sub-block. The system then automatically draws the blocks to an optimum size. Boundaries defining the edge of a plurality of blocks are moved to accommodate the bounded sub-block requiring the most space.

8 Claims, 3 Drawing Sheets

APPARATUS AND PROCESS FOR CREATING VARIABLY SIZED BLOCK DIAGRAMS TO ACCOMMODATE VARIABLE TEXT CONTENTS WHILE YET RETAINING OVERALL BLOCK SHAPE

The present invention relates to a computer aided design (CAD) system for displaying block diagrams, the system comprising a data input device, a processing unit, a memory device and an output device for displaying text and graphics.

As used herein "block diagram" includes linked block diagrams and nested block diagrams.

A problem with known CAD systems of the aforementioned type is that they are only capable of handling complete blocks thus requiring the whole block to be redefined if one sub-block is not large enough to receive all of its allocated text.

According to a first aspect of the invention there is provided a computer aided design (CAD) system comprising a data input device, a processing unit, a memory device and an output device for displaying text and graphics, the memory device being arranged to receive input instructions from the data input device via the processing unit, wherein the processing unit processes said input instructions and supplies output instructions to the output device, and the output device displays a block in response to the output instructions; characterised in that the block is devided into a plurality of sub-blocks, text is placed a first one of the sub-blocks in response to output instructions processed from input instructions, the size of the first sub-block is determined by the size of said text and the size of the other sub-blocks is increased to maintain the overall shape of the block.

In a preferred embodiment the sub-blocks are defined by boundaries (A, B, C, D, E, F) wherein each boundary is substantially straight, lies at a predetermined angle and is arranged to be moved along an axis perpendicular to its length.

Preferably the position of each boundary is calculated from the input instructions, to produce boundary parameters for each sub-block, and boundary relationships which define a relationship between parameters of different sub-blocks.

The invention will now be described by way of example only with reference to the accompanying drawings, of which:

Figure 1:
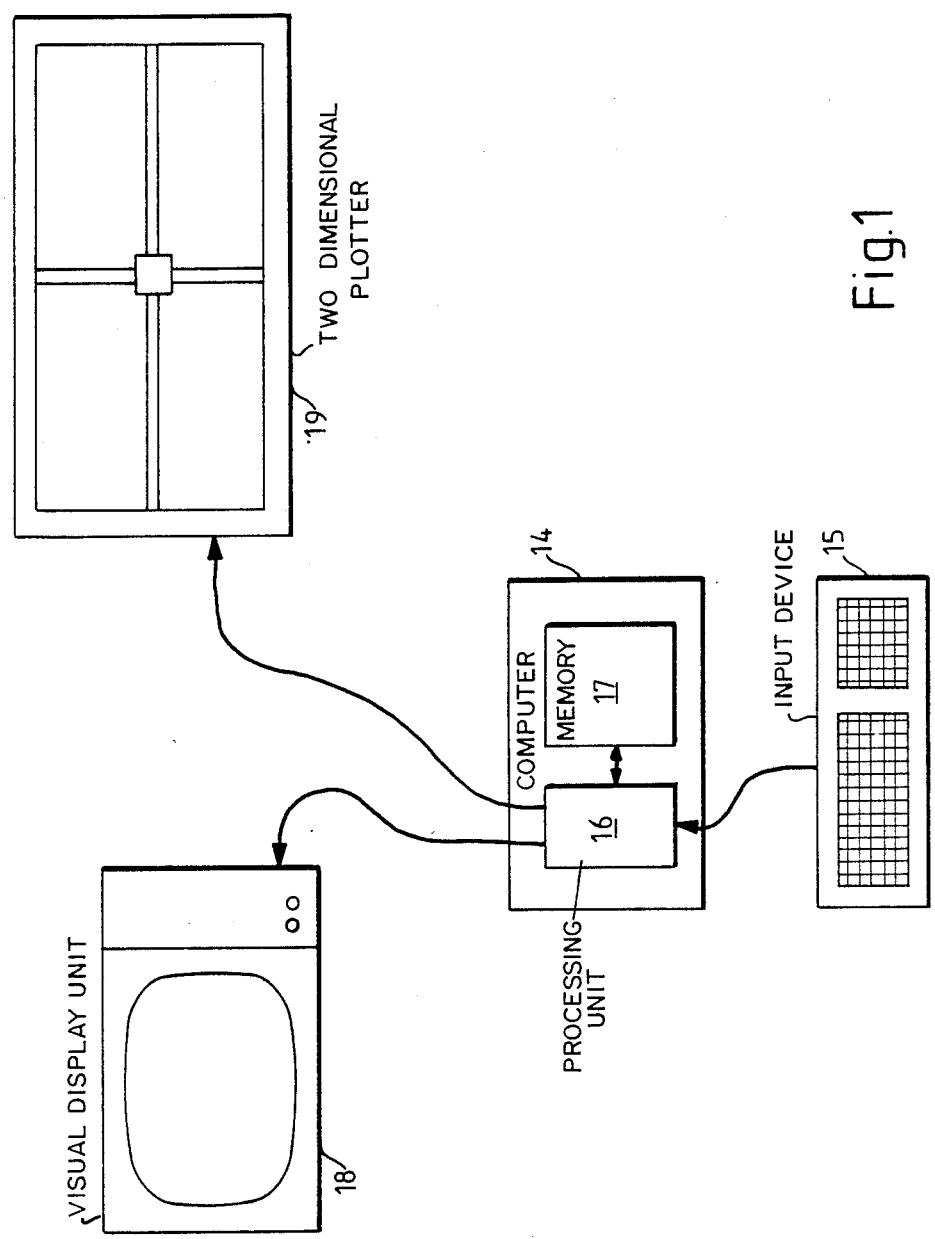
FIG. 1 shows a CAD system for drawing block diagrams.

A computer 14 is shown in FIG. 1 at the heart of a CAD system. An operator enters information via an input device 15 (keyboard, mouse or graphics tablet etc) which in turn supplies input instructions to the computer.

The computer includes a processing unit 16 and a memory device 17 and is arranged to store the input instructions in input files, process the input files and generate an output file. An output file is a coded version of block diagram which is operated on by the processing unit. The processing unit also generates output instructions from the output file which are supplied to a visual display unit (VDU) 18 and a two dimensional plotter 19.

In addition to providing input instructions for defining the shape of each block the operator may also insert text into a block. Each block may be divided into a plurality of sub-blocks and text may be entered into any selected sub-block. Text is constructed from a string of characters and each character is a fixed size with respect to the overall size of the frame. The size of a character string is therefore defined as being 2w characters wide and 2h characters high.

Figures 2, 3:
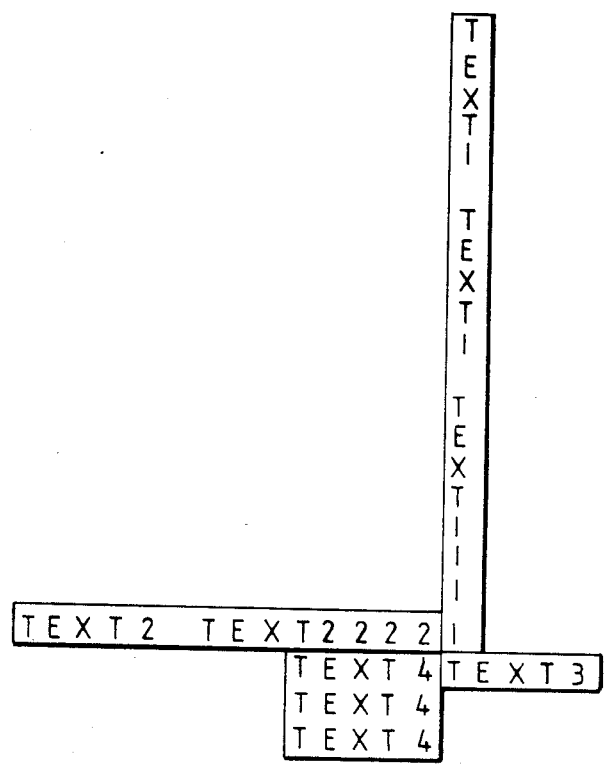
FIG. 2 shows a block with four sub-blocks.
FIG. 3 shows the block of FIG. 2 in which the size of each sub-block has been increased by the minimum amount necessary to receive its allocated text; and, FIG. 4 shows the block of FIG. 3 in which the size of the sub-blocks has been increased to maintain the overall shape of the block.

A rectangular block having four sub-blocks 1, 2, 3, 4 is shown in FIG. 2. Each sub-block is two characters wide and two characters high (4w×4h) and represents the default size of a rectangular block with no text. Text is added into the sub-blocks by processing a first set of input instructions which specify the character string for each sub-block. From this the processor determines the size of each character string, for example:

sub-block 1—1 character wide, 20 characters high
sub-block 2—14 characters wide, 1 character high
sub-block 3—5 characters wide, 1 character high
sub-block 4—5 characters wide, 3 characters high If the whole block is enlarged to accommodate this text then the shape of the default block is retained but the resulting block would be 40 characters wide by 40 characters high. The disadvantage of this approach is that blocks take up too much space thus reducing the number of blocks which may be shown within one frame. In the present system the size of each sub-block is independently adjusted to accommodate its allocated text.

Figure 4:
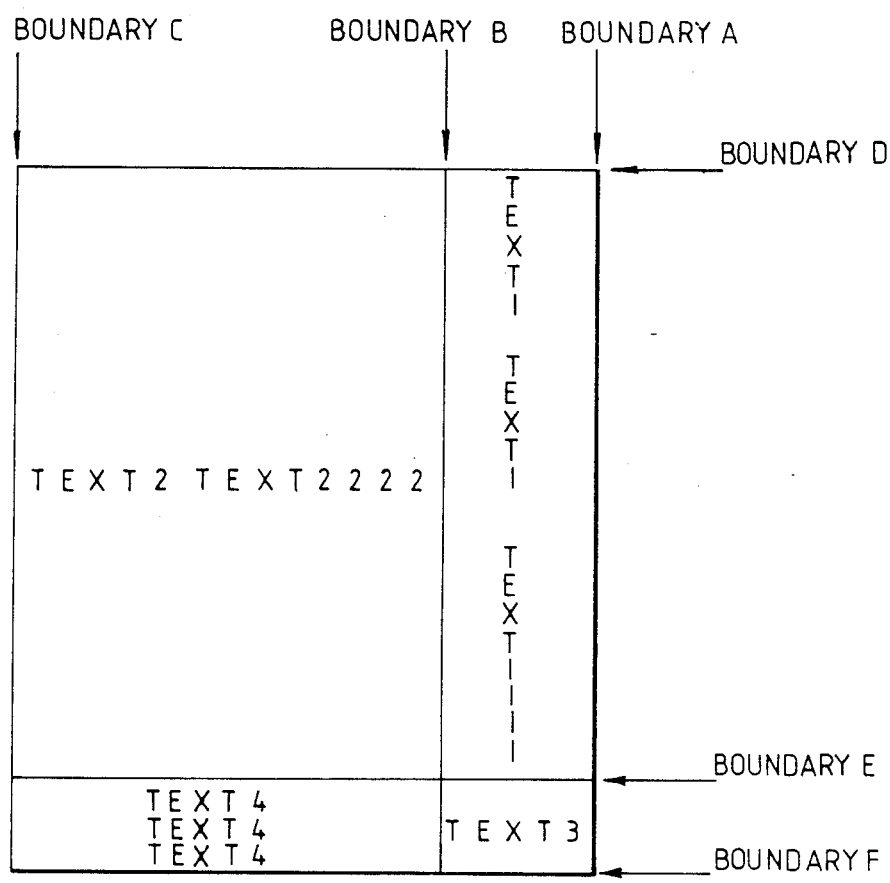

The effect of enlarging each sub-block to accommodate its allocated text while not placing any further constraints on the system is shown in FIG. 3. The resulting block does not occupy a large area but its shape has been greatly distorted. This is unsatisfactory in block diagrams because the shape of each block often identifies its function. Thus a rectangular block does not have to be exactly the same shape as the default block but it must be rectangular. The optimum block therefore lies between the two extremes identified above and is shown in FIG. 4.

To generate the block shown in FIG. 4 a second set of input instructions are supplied which are written in the following format.

Block 1

Sub-block 1

| | |
|---|---|
| Boundary | A = w |
| Boundary | B = −w |
| Boundary | D = h |
| Boundary | E = −h |
| Rectangle −w, −h, w, h | |
| End sub-block | |

Sub-block 2

| | |
|---|---|
| Boundary | B = w |
| Boundary | C = −w |
| Boundary | D = h |
| Boundary | E = −h |
| Rectangle −w, −h, w, h | |

Sub-block 3

| Boundary  | A = w      |
|-----------|------------|
| Boundary  | B = −w     |
| Boundary  | E = h      |
| Boundary  | F = −h     |
| Rectangle | −w, −h, w, h |
| End Sub-block | |

Sub-block 4

| Boundary  | B = w      |
|-----------|------------|
| Boundary  | C = −w     |
| Boundary  | E = h      |
| Boundary  | F = −h     |
| Rectangle | −w, −h, w, h |
| End sub-block | |
| End block 1 | |

The second set of input instructions identify boundaries with respect to parameters and a local origin. Each parameter refers to the size of text to be entered in the respective sub-block and defines the distance between a boundary and the centre of the sub-block, which is adopted as the local origin.

An algorithm for generating a set of output instructions from new or amended input instructions is termed a block generation subroutine. The subroutine comprises the steps of:

1. giving values to the parameters in the second set of input instructions from the values indicating the size of character strings in the first set of input instructions;
2. defining boundaries with respect to one origin while following boundary laws; and
3. defining the boundaries with respect to a common origin for the whole frame.

The boundary laws ensure that a boundary can only exist as a single straight line at a fixed angle with respect to the frame—ie horizontal or vertical. Furthermore a boundary may only move along an axis which is perpendicular to said boundary and it cannot be rotated, twisted, or bent etc. Thus when a boundary is specified by two or more parameters a relationship is established between these parameters.

The block generation subroutine will now be described in detail with respect to the example considered above and shown in FIG. 4. The parameter values from the first set of input instructions are substituted into the second set of input instructions thus:

Sub-block 1, $w(1)=\frac{1}{2}$, $h(1)=10$
 Thus Boundary $A(1)=+\frac{1}{2}$
  Boundary $B(1)=-\frac{1}{2}$
  Boundary $D(1)=+10$
  Boundary $E(1)=-10$
Sub-block 2, $w(2)=7$, $h(2)=\frac{1}{2}$
 Thus Boundary $B(2)=+7$
  Boundary $C(2)=-7$
  Boundary $D(2)=+\frac{1}{2}$
  Boundary $E(2)=-\frac{1}{2}$
Sub-block 3, $w(3)=2\frac{1}{2}$, $h(3)=\frac{1}{2}$
 Thus Boundary $A(3)=+2\frac{1}{2}$
  Boundary $B(3)=-2\frac{1}{2}$
  Boundary $E(3)=+\frac{1}{2}$
  Boundary $F(3)=-\frac{1}{2}$
Sub-block 4, $w(4)=2\frac{1}{2}$, $h(4)=-1\frac{1}{2}$
 Thus Boundary $B(4)=+2\frac{1}{2}$
  Boundary $C(4)=-2\frac{1}{2}$
  Boundary $E(4)=+1\frac{1}{2}$
  Boundary $F(4)=-1\frac{1}{2}$ Now the system calculates the position of the boundaries and the local origins with respect to the local origin of sub-block 1 identified herein as origin(1). The position of boundary A is defined by A(1) as half a character to the right. The position of boundary B is defined by B(1) as half a character to the left, origin (2) (by B(2)) is ($\frac{1}{2}+7$) $7\frac{1}{2}$ characters to the left and boundary C is $14\frac{1}{2}$ characters to the left (from C(2)). Boundary D is 10 characters up, Boundary E is 10 characters down and Boundary F is 11 characters down, E(1)+E(3)+F(3).

Thus at this stage:
 Boundary $A(1)=+\frac{1}{2}$
 Boundary $B(1)=-\frac{1}{2}$
 Boundary $D(1)=+10$
 Boundary $E(1)=-10$ Expressions for the same boundary but having different signs allow the local origins to be specified with respect to the local origin of sub-block 1, thus $$\text{Origin } 2(1) = -7\tfrac{1}{2},\ 0$$

The system calculates the position of origin (2) relative to origin (1) from the boundary statements, thus:

$$B2(1) = -\tfrac{1}{2}$$

$$C2(1) = -14\tfrac{1}{2}$$

Now $D(2)=+\frac{1}{2}$ but $D(1)=+10$ which violates a boundary law. A relationship between these parameters is therefore established such that $D(2)=D(1)$ and the smaller value is made equal to the larger value. This also applies to E(2) so that:

$$D2(1) = +10$$

$$E2(1) = -10$$

The system now considers sub-block 3.

$$A(3) = +2\tfrac{1}{2} \text{ but } A(1) = +\tfrac{1}{2}$$

so, as described above, A(1) is made equal to A(3) and:

Boundary $A3(1)=+2\frac{1}{2}$ and $A(1)=+2\frac{1}{2}$

Boundary $B3(1)=-2\frac{1}{2}$ and $B(1)=-2\frac{1}{2}$ $$E3(1) = -10$$

from which $$\text{Origin } 3(1) = -10\tfrac{1}{2}$$

and Boundary $F3(1)=-11$

So at this stage:

| | |
|---|---|
| Boundary A(1) = | $2\frac{1}{2}$ |
| Boundary B(1) = | $-2\frac{1}{2}$ |
| Boundary D(1) = | $+10$ |
| Boundary E(1) = | $-10$ |
| Origin 2(1) = | $-7\frac{1}{2}, 0$ |

-continued

```
Boundary B2(1) = -½
Boundary C2(1) = -14½
Boundary D2(1) = +10
Boundary E2(1) = -10
Origin 3(1) = 0, -10½
Boundary A3(1) = 2½
Boundary B3(1) = -2½
Boundary E3(1) = -10
Boundary F3(1) = 11
```

The system now checks to see if any boundary laws have been broken and identifies $B(1) = -2½$ but $B2(1) = -½$ therefore the value of $B2(1)$ is changed to $-2½$.

However moving boundary B compresses sub-block 2 so that it is less than 2w(2) characters wide hence:

```
Origin 2(1) = 9½
Boundary C2(1) = -16½
hence:
Boundary A(1) = 2½
Boundary B(1) = -2½
Boundary D(1) = +10
Boundary E(1) = -10
Origin 2(1) = 9½, 0
Boundary B2(1) = -2½
Boundary C2(1) = 16½
Boundary D2(1) = +10
Boundary E2(1) = -10
Origin 3(1) = 0, -10½
Boundary A3(1) = 2½
Boundary 3(1) = -2½
Boundary E3(1) = -10
Boundary F3(1) = 11
```

The system now considers sub-block 4

Boundary $B(4) = +2½$

Boundary $C(4) = -2½$

Boundary $E(4) = +1½$

Boundary $F(4) = -1½$

Boundary C(4) has the same sign as C2(1) therefore Boundary C4(1) is made equal to C2(1)

Boundary $C4(1) = -16½$

The width is therefore less than that for sub-block 2 so

Boundary $B4(1) = -2½$

Boundary $E(1) = -10$

Therefore origin 4(1) is $-10 - 1½ = -11½$ and
Boundary $F4(1) = -11½ - 1½ = -13$
thus Boundry $B4(1) = -2½$ Boundary $C4(1) = -16½$ Boundary $E4(1) = -10$ Boundary $F4(1) = -13$ Origin $4(1) = -9½, -11½$ On checking the boundary laws F3(1) is made equal to F4(1). The system has reached the end of the second input instructions therefore the redundant terms may be removed thus defining the block as:

Vertical Boundaries $A(1) = 2½$
$B(1) = -2½$
$C(1) = -16½$

Horizontal Boundaries $D = +10$
$E = -10$
$F = -13$

The position of the origin is now shifted to a block entry point.

A vector defines the relationship between the two origins and its horizontal and vertical components are added to the values for the vertical and horizontal boundary values respectively. A similar translation allows the block to be positioned within the frame.

The complexity of the algorithm depends on the complexity of the block diagrams to be drawn but the same principles are followed. The boundaries are not necessarily coincident with the outline of a block and different shaped blocks are possible, for example circles, parallelograms, hexagons etc. The boundaries define regions into which text may be placed so that a single character string must be placed within one of these regions.

Each block is defined by two sets of input instructions which are stored in respective files. Each pair of input instructions are cross referenced by a unique number allowing a plurality of first and second sets of instructions to be loaded and then processed collectively. An output file is then generated containing a plurality of sets of output instructions. Additional features such as the position of entry and exit points and the position of block linkages may be added to the output file or stored in a separate output file and then combined for generating output instructions.

I claim:

1. A computer aided design system comprising:
   a data input device,
   a process unit,
   a memory device, and
   an output device for displaying text and graphics,
   the memory device for receiving input instructions from the data input device via the processing unit,
   wherein the processing unit processes said input instructions and supplies output instructions to the output device, and the output device displays a block in response to the output instructions in which the block is divided into a plurality of sub-blocks by the processing unit in response to input instructions, the size of the first sub-block being determined by the size and amount of said text, and the size of another sub-block is adjusted to maintain the overall shape of the block.

2. A computer aided design system comprising:
   a data input device,
   a processing unit,
   a memory device, and
   an output device for displaying text and graphics,
   the memory device for receiving input instructions from the data input device via the processing unit,
   wherein the processing unit in response to said input instructions determines sizes of sub-blocks of a block and supplies output instructions to the output device, and the output device displays said sub-block in response to the output instructions processed from input instructions, the size of a first sub-block is determined by the size of said text, and the size of another sub-block is adjusted to maintain an overall shape of the block;

in which the sub-blocks are defined by boundaries (A, B, C, D, E, F) wherein each boundary is substantially straight, lies at a predetermined angle and is arranged to be moved along an axis perpendicular to its length.

3. A CAD system according to claim 2 in which the position of each boundary is calculated from the input instructions, to produce boundary parameters for each sub-block, and boundary relationships which define a relationship between parameters of different sub-blocks.

4. A method for machine creating variably sized block diagrams to accommodate variable text contents while yet retaining overall block shape, said method comprising:
 defining a block having predetermined shape and size and including plural contiguous sub-blocks therewithin of predetermined respective sizes and shapes;
 assigning variable amounts of text to the individual sub-blocks requiring changes to the size and shape of at least one sub-block to retain the assigned text within its boundaries; and
 changing the size and shape of at least one other said sub-block to maintain the predetermined shape of the overall block while increasing the size of said overall block.

5. Apparatus for machine creating variably sized block diagrams to accommodate variable text contents while yet retaining overall block shape, said apparatus comprising:
 first means for defining a block having predetermined shape and size and including plural contiguous sub-blocks therewithin of predetermined respective sizes and shapes;
 further means operatively associated with said first means for assigning variable mounts of text to the individual sub-blocks requiring changes to the size and shape of at least one sub-block to retain the assigned text within its boundaries; and
 means operatively associated with said first and further means for changing the size and shape of at least one other said sub-block to maintain the predetermined shape of the overall block while increasing the size of said overall block.

6. A computer aided design system comprising:
 a data input device,
 a processing unit,
 a memory device, and
 an output device for displaying text and graphics,
 the memory device for receiving input instructions from the data input device via the processing unit,
 the processing unit processing said input instructions and supplying output instructions to the output device,
 the output device displaying a block in response to said output instructions,
 said processing unit including means for dividing said block into a plurality of sub-blocks of determined size and boundaries in response to said input instructions,
 means for associating each of said sub-blocks with at least two others of said sub-blocks at least one of which is vertically adjacent and at least one of which is horizontally adjacent,
 wherein for each of said sub-blocks containing horizontally orientated text, horizontal boundary size is determined by length of said text and horizontal boundary size of each of said at least one associated vertical sub-blocks is correspondingly adjusted; and
 for each said sub-block containing vertically orientated text a vertical boundary of said sub-block is determined by the length of said vertically orientated text, and a vertical boundary of each said at least one horizontally associated sub-block is correspondingly adjusted.

7. A computer aided design system as in claim 6 in which the sub-blocks are defined by boundaries (A, B, C, D, E, F) wherein each boundary is substantially straight, lies at a predetermined angle and is arranged to be moved along an axis perpendicular to its length.

8. A computer aided design system as in claim 7 in which the position of each boundary is calculated from the input instructions, to produce boundary parameters for each sub-block, and boundary relationships which define a relationship between parameters of different sub-blocks.

* * * * *